June 7, 1955  L. RASSNER  2,709,853
HAND MEASURING BOWLING BALL
Filed July 1, 1952  3 Sheets-Sheet 1
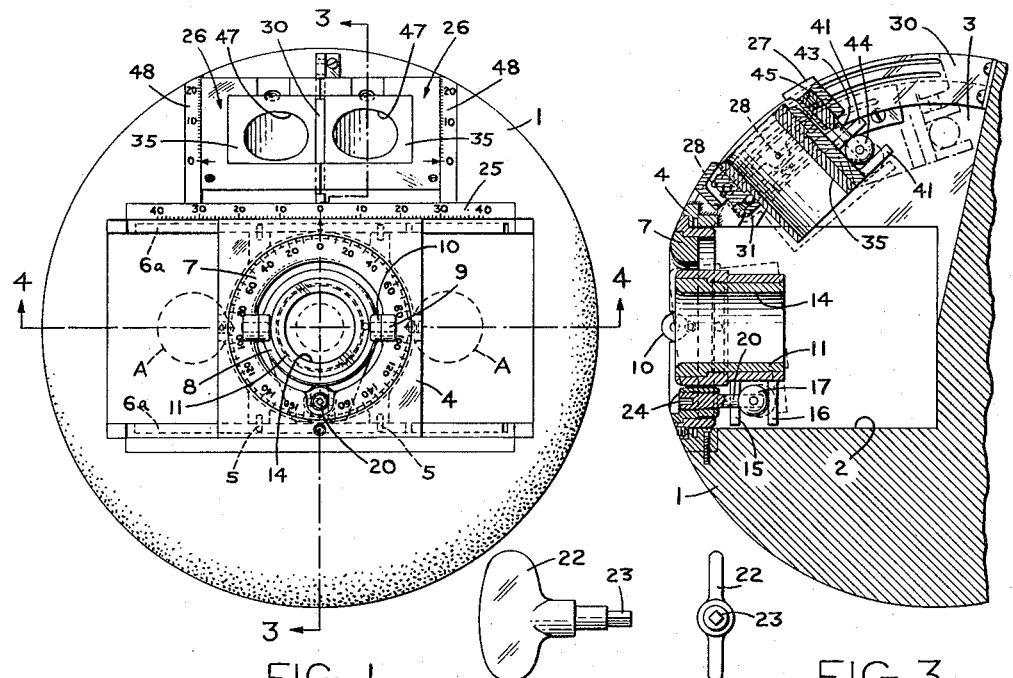
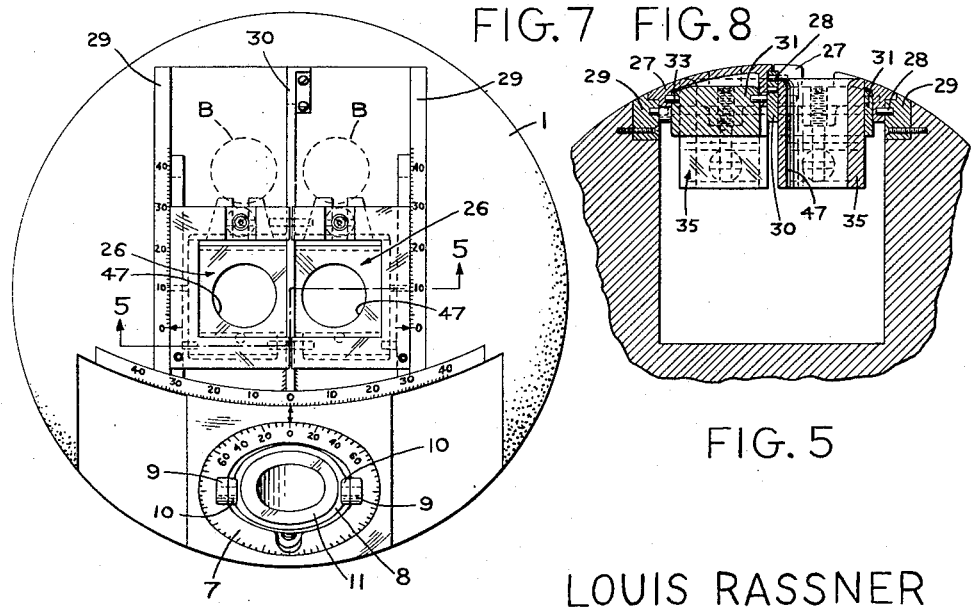
LOUIS RASSNER
INVENTOR.
BY June 7, 1955  L. RASSNER  2,709,853
HAND MEASURING BOWLING BALL
Filed July 1, 1952  3 Sheets-Sheet 2
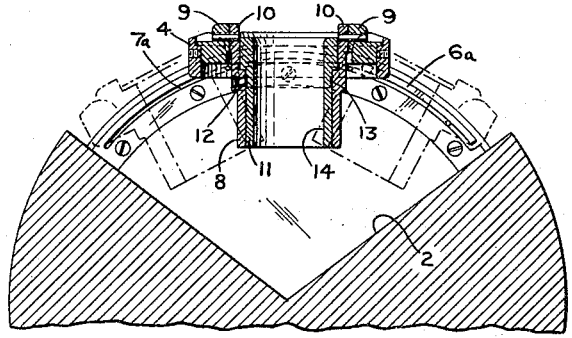
FIG. 4
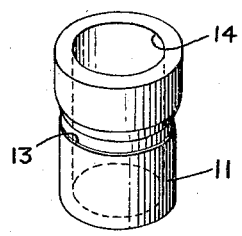
FIG. 9
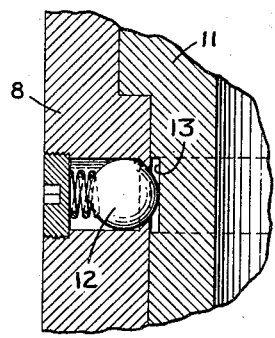
FIG. 6
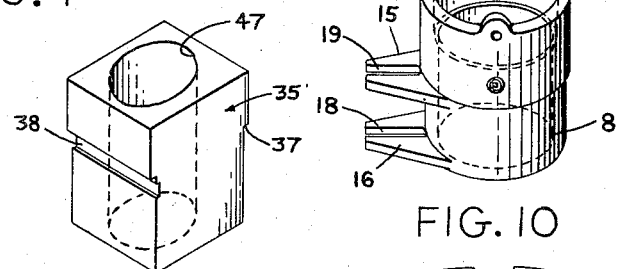
FIG. 13　FIG. 10
FIG. 14
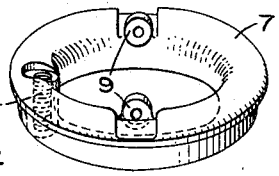
FIG. 11
FIG. 12
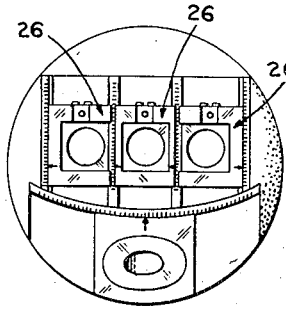
FIG. 16
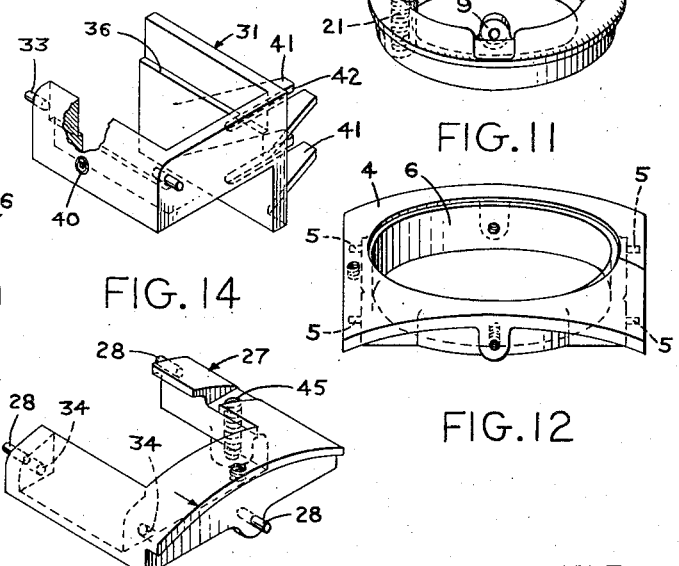
FIG. 15
LOUIS RASSNER
INVENTOR.

June 7, 1955  L. RASSNER  2,709,853

HAND MEASURING BOWLING BALL

Filed July 1, 1952  3 Sheets-Sheet 3

LOUIS RASSNER
INVENTOR.

BY
ATTORNEY

United States Patent Office 2,709,853
Patented June 7, 1955

---

2,709,853

HAND MEASURING BOWLING BALL

Louis Rassner, North Bergen, N. J.

Application July 1, 1952, Serial No. 296,636

16 Claims. (Cl. 33—174)

This invention relates to a hand span and pitch measuring ball by means of which the proper and accurate positioning of the thumb and finger holes in a bowling ball may be determined both as to the relative spacing and the pitch and angularity of the holes to meet the requirements of each individual bowler to provide a bowling ball with an arrangement of finger and thumb receiving holes particularly adapted to the individual bowler, whereby the ball may be held with a restful, easy grip without unnatural flexure of the muscles and released easily and accurately without the possibility of introduction of forces in the release which would interfere with the accurate movement of the ball.

No two persons' hands are exactly alike, although all normal hands have some measurements which are approximately the same, for instance the distance between the fingers, and since accurate control of a bowling ball upon delivery by the bowler depends to a major extent on the manner in which the ball is gripped before delivery, it is highly desirable both from the standpoint of accuracy of delivery and comfort of the bowler's fingers with its resulting lack of improper strain on hand and arm muscles, that accurate measurements of the hand in the position for gripping a bowling ball be obtained and that the thumb and finger holes be drilled in the bowling ball in accordance with such measurements.

In other words, the present invention relates to a measuring ball by means of which accurate measurement of a bowler's hand may be made to permit custom drilling of the thumb and finger holes to exactly suit each individual bowler, and by means of which the pitch and angularity and cooperative relationship of the finger and thumb receiving holes in a bowling ball may be determined to facilitate the rolling of a "hook" or curve ball, a straight ball or a "back-up" ball as desired.

Another object of the present invention is to provide a measuring ball as specified which is so constructed and designed that in instances where the bowler has a deformed hand accurate measurement of the abnormal hand may be made so that a proper grip on a bowling ball drilled in accordance with the measurements obtained may be made, as well as a measuring ball suitable for measuring either right or left hands.

Another object of the present invention is to provide a hand measuring ball as specified in which the relationship of pitch between the thumb and finger receiving holes in a bowling ball is regulated or measured due to the lateral and rotative movement of the thumb measuring unit.

The features in a bowling ball particularly adapted to the individual bowler to provide a restful, easy grip without stress on the muscles and permit easy and accurately controlled release are:

(a) Finger hole size,
(b) Span between thumb and individual finger receiving holes
(c) Relative position of fingers to thumb, i. e., whether the thumb receiving hole is drilled directly on the medial lines between the finger, or to the left or right of the medial line, and to what extent,
(d) The degree of pitch of each finger hole and thumb receiving hole,
(e) The direction or line of pitch of the finger in relation to the thumb,
(f) The weight of the ball.

and the present invention relates to a measuring ball, by which all of the above enumerated features can be obtained or determined all at one time. The weight of the ball is regulated as desired by insertion of predetermined weights into the ball.

More specifically the present invention comprehends a hand measuring ball for use in accurately measuring a bowler's hand to provide a pattern for the drilling of the thumb and finger holes in a bowling ball which includes among other novel features, means for positively regulating the lateral spacing of the finger receiving measuring plugs; means for supporting the thumb receiving measuring plug for lateral, rotary and pivotal movement, means for regulating the lateral pitch and angularity of the finger receiving holes together with means for regulating the pitch and angularity of the thumb receiving hole in any direction to provide the desired relationship of pitch and angle of pitch between the thumb and finger holes; together with various novel features of specific construction.

In the drawings:

Figure 1 is a plan view of a hand measuring ball constructed in accordance with the present invention, showing the thumb receiving unit in direct plan.

Figure 2 is a plan view of the hand measuring ball positioned to show the finger receiving units in direct plan.

Figure 3 is a fragmentary cross section through the thumb receiving unit and one finger receiving unit and taken on the line 3—3 of Figure 1.

Figure 4 is a fragmentary cross section through the thumb unit taken at right angles to the section shown in Figure 3 and on the line 4—4 of Figure 1.

Figure 5 is a fragmentary section through the finger receiving units and taken on the line 5—5 of Figure 2.

Figure 6 is a detail section illustrating releasable locking means for holding the thumb or finger receiving stalls or plugs in their respective carriers.

Figures 7 and 8 are detail views in side and end elevation of a key used in adjusting the positions of the thumb and finger receiving units.

Figure 9 is a perspective view of the removable thumb receiving stall or plug.

Figure 10 is a perspective view of the thumb stall or plug retainer.

Figure 11 is a perspective view of the rotator or rotatable member which carries the stall retainer shown in Figure 10.

Figure 12 is a perspective view of the laterally movable carrier which is slidably carried by the ball and supports or carries this rotator shown in Figure 11.

Figure 13 is a perspective view of a finger receiving plug or stall.

Figure 14 is a perspective view of the retainer which supports the finger receiving plug or stall shown in Figure 13.

Figure 15 is a perspective view of a carrier which is slidably carried by the ball and pivotally supports the retainer shown in Figure 14.

Figure 16 is a plan view of a modification of the measuring ball shown in Figures 1 to 15, wherein three finger receiving units are shown.

Figure 17:
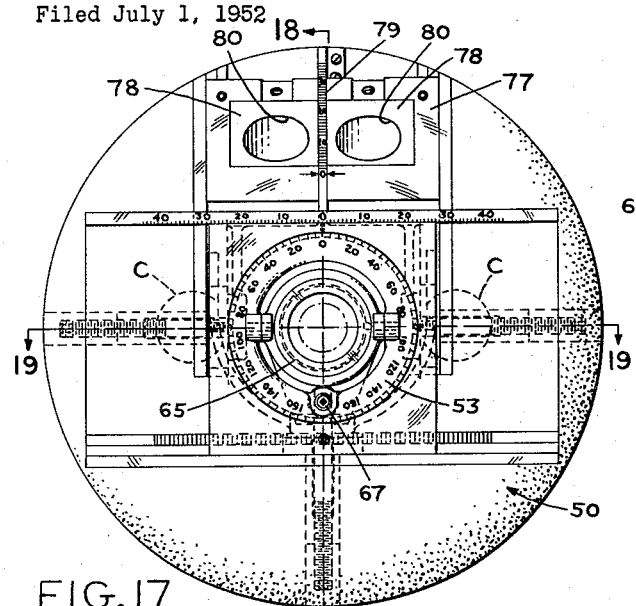
Figure 17 is a plan view of another form of the hand measuring ball.

Referring more particularly to the form of the hand measuring ball shown in Figures 1 to 15 inclusive, a ball 1 simulating a bowling ball or, in fact, it may be a bowling ball which is cut away and provided with various structures to permit the precision measuring of the hand of the prospective user so that the relative positions of the thumb and fingers and the pitch angle at which the fingers and thumb engage the ball may be measured so that a regular bowling ball may be drilled in exact accordance with measurements provided by the present invention.

The ball 1 has a recess 2 cut therein extending from its outer surface axially inwardly and extending across the ball 1 parallel with the diameter thereof. A second recess or an extension 3 of the recess 2 is also cut in the ball and extends parallel to and at right angles to the recess 2 as shown in Figures 1, 2 and 3 of the drawings.

The thumb receiving unit is located in the recess 2 and it comprises a carrier 4 (see Figure 12). The carrier 4 has a plurality of pins 5 projecting laterally from open sides thereof which pins engage in guides 6. The arcuate guides 6 are attached in any suitable manner to the diametrically extending parallel walls of the recess 2 and they have slots 7 therein in which the pins 5 ride so that the carrier and the thumb receiving unit carried thereby may be moved laterally of its axis in substantially the line of curvature of the surface of the ball 1 to position the thumb receiving unit at various laterally placed positions with respect to the radii of the ball 1 extending through the axis of the carrier 4 when the carrier is centrally located between the ends of the recess 2, that is, is located in the position shown in Figure 1 of the drawings. The dotted line A in Figure 1 illustrates the limits of this lateral movement of the thumb receiving unit.

The carrier 4 is provided with a circular opening 6 which receives therein the rotator 7 for rotatably supporting the rotator in and on the carrier 4. A thumb stall for receiving retainer 8 which is substantially cylindrical in construction in inserted through the rotator 7 and the carrier 4 and is pivotally connected at diametrically opposed points to the rotator 7 by means of pins (not shown) which are inserted through the trunnions 9 on the rotator and 10 on the retainer. The thumb receiving stall or plug 11 is also cylindrical in shape and fits in the retainer 8 in which it is releasably held by means of a spring pressed ball 12 which engages in an annular recess 13 formed in the stall or plug 11 intermediate its ends. The spring pressed ball or element 12 forms a releasable lock for holding the thumb stall or plug in the retainer. It is understood, of course, that a plurality of thumb receiving stalls or plugs 11 are provided with each hand measuring ball, the different stalls having different diameter thumb receiving holes 14 therein to fit different sized thumbs of the persons being measured.

The retainer 8 has a pair of parallel horizontal ears 15 and 16 formed thereon and projecting laterally therefrom and a pivoting element or structure for pivotally moving the retainer 8 and the thumb stall or plug carried thereby with respect to the rotator 7 and carrier 4 is provided which includes a ball or spherical element 17 which is engaged between the ears 15 and 16 with its undersurface riding in or fitting in the slot 18 formed in the ear 16. The ear 15 is split as shown at 19 and the stem 20 upon which the ball or spherical element 17 is carried extends through the slot 19 and has its outer end threaded into a threaded opening 21 extending through the rotator 7 so that by adjustment of the stem 20 the retainer 8 and thumb receiving stall 11 may be pivoted relative to the rotator 7 as indicated by dotted lines in Figure 3 of the drawings. Figures 7 and 8 show a key 22 having an operating end 23 for fitting in a suitable recess 24 in the outer end of the stem 20 to facilitate rotating of the stem.

Thus it will be seen that through the medium of the lateral adjustment of the thumb receiving unit, the rotary movement of the rotator 7 carrying the retainer 8 and stall 11 with respect to the carrier 4 and the pivotal movement of the retainer 8 and stall 11 relative to the rotator will permit an infinite number of lateral and angular positions of the thumb stall thus providing variation in the pitch angle of the thumb receiving hole in the stall 11 not only in a direction perpendicular to the lateral movement of the thumb stall but at any angular relation to the pitch angle of the stall 11 when it is placed at its intermediate lateral position and in a straight radial position.

Rotator 7 may be provided with a graduated scale as shown in Figure 1 of the drawings by means of which the position of the retainer 8 and stall 11 in respect to its normal position and altered by rotation of the rotator may be easily determined and read. A scale 25 is attached to the ball 1 along one of the parallel sides of the recess 2 to indicate and permit accurate reading of the positioning of the thumb stall provided by its lateral movement.

A plurality of finger receiving units generically indicated at 26 are inserted in the lateral extension 3 of the recess 2. These units are identical in construction. And while two of them are shown in Figure 1 of the drawings any desired number of units as, for instance, one or three, as is shown in Figure 16 of the drawings, may be provided depending upon the number of finger holes which are to be drilled in the bowling ball. Most bowlers prefer either one or two finger receiving holes in their bowling balls but sometimes some bowlers like to use three fingers and when such is the case it is necessary to use three of the finger receiving units in the measuring ball and it is to be understood that the present invention is to be limited to no specific number of finger receiving units employed.

Each of the finger receiving units 26 includes a carrier 27 which has a plurality of pins 28 projecting from oposite sides thereof which engage in the slots cut in the side rails 29 and the center rail or track 30. The side rails or tracks 29 are attached to the ball 1 at the opposite parallel sides of the lateral extension 3 of the recess 2, while the center rail or track is placed intermediate the two parallel side walls and in parallel relation to the tracks 29. This center track 30 provides a further function which will be hereinafter referred to. The pins 28 riding in the recesses or slots in the tracks 29 and 30 permit lateral movement of the carrier 27 and consequently of the finger receiving units along a line parallel with the diametrical plane bisecting the ball 1 at right angles to the diametrical plane on which the thumb receiving unit is moved laterally. A retainer 31 is provided for each of the finger receiving units 26 and it is substantially rectangular in shape so that it fits within the substantially U-shaped opening formed in the carrier 27. The retainer 31 is pivotally connected to the carrier 27 at the upper inner edge of the carrier by means of pins 33 which fit in suitable sockets 34 formed in the carrier and the retainer 31 is also substantially U-shaped in plan receiving therein a finger receiving stall 35 which is rectangular in shape. The retainer 31 has shoulders 36 formed thereon which are engaged by the shoulders 37 formed on the thumb stall or plug 35 to limit and regulate the vertical position of the thumb stall or plug 35 in the retainer. The thumb stall or plug 35 is releasably locked in the retainer 31 by means of a spring pressed locking ball such as the ball 12 shown in Figure 6 of the drawings which seats in a recess or groove 38 formed in one side of the stall 35 intermediate of its ends. The locking means is indicated generically at 40 in Figure 14 of the drawings. A pair of horizontal parallel ears 41 project laterally from the side of the retainer opposite to the side which is pivoted at its upper corner to the carrier 27 and the upper of these parallel ears 41 is provided with a slot 42 through which the pivotally adjusting stem 43 extends. A spherical or ball member 34 is carried by the inner end of the stem 43 and engages between the ears 41. The stem 43 is threadably carried by the carrier 27 as indicated at 45 and it is adjustable by means of the key 22 to pivotally move the stall 35 and the retainer 31 relative to the carrier 27. Unlike the carrier 4 the carrier 27 is not rotatable so that the varying of the pitch angle of the finger receiving hole 47 in the stall 35 may be made only in a plane perpendicular or at right angles to the plane of the lateral movement of the thumb receiving unit.

A number of finger receiving stalls or plugs 35 are provided for each measuring ball with different sized finger receiving openings 47 therein to fit different sized fingers of persons desiring to be measured for a bowling ball. However, since regardless of the size of the fingers of the persons being measured the space or distance between the fingers at their inner ends or where they join the hands proper is always substantially the same, i. e., ⅜ of an inch. Therefore to provide for the proper lateral positioning of the finger receiving openings in the two or more finger receiving units 26 utilized in the measuring ball the finger receiving openings 47 are always drilled at a definite predetermined distance inwardly of the edge or side of the stall 35 which faces the other finger receiving unit and the central rail 30 so that by spacing the innermost edges of the walls of the finger receiving stalls a definite distance from the inner sides of the stalls and due to the fact that the center track 30 is of a definite predetermined thickness the lateral space between the finger receiving openings will always be the same regardless of their diameter.

Scales 48 are placed along each side of the lateral extension 3 of the recess 2 or they may be formed on the upper outer edges of the side rails 29 to indicate the position of the finger receiving stalls laterally of the thumb receiving stall. The dotted line circles B in Figure 2 of the drawings indicate the limit of the lateral movement of the finger receiving units 26 and of course each of these units is movable both laterally and pivotally relative to the other and relative to the thumb receiving unit.

Due to the various lateral adjustments of the thumb and finger stalls relative and independently of each other, the pivotal movement of the finger stalls and the rotary and pivotal movement of the thumb receiving stall the openings in the respective stalls may be located and their pitch angle regulated to fit any bowler's hand so that by means of a jig or measuring apparatus set in exact accordance with the adjustment of the various stalls the bowling ball can be drilled to the exact requirements of the individual bowler even though he is right or left handed or his hand be deformed. The form of the invention shown in Figures 17 to 21 inclusive differs from the form shown in Figures 1 to 16 inclusive although the elements comprising the thumb receiving unit and the finger receiving units as shown in Figures 9 to 11 and 13 and 14 inclusive of the drawings are the same in both forms of the invention. The ball 50 shown in Figures 17, 18 and 29, like the ball 1, is provided with a substantially "pie-slice" shape recess 51 cut therein having a lateral extension 52 of the recess as formed in the ball for receiving and containing the finger receiving units, while the thumb receiving unit is retained in the recess 51.

Figure 18:
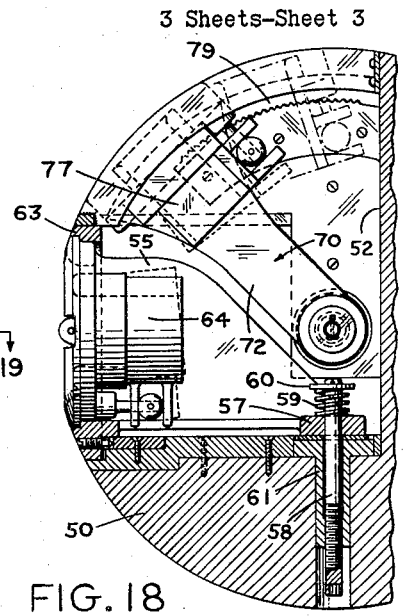
Figure 18 is a fragmentary section through the ball shown in Figure 17 and taken on the line 18—18 of Figure 17.
Figure 19:
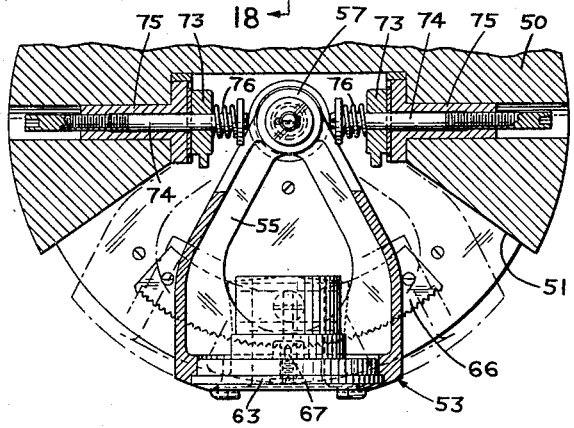
Figure 19 is a fragmentary section through the ball shown in Figure 17, taken at right angles to the section shown in Figure 18 and on the line 19—19 of Figure 17.
Figure 21:
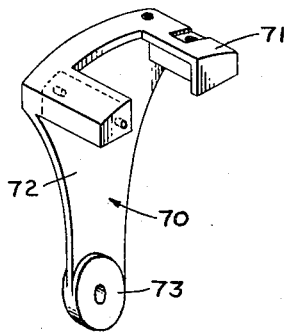
Figure 21 is a perspective view of a carrier used in the construction of ball shown in Figure 17 and which carries the finger stall or plug retainer shown in Figure 14 of the drawings.
Figure 20:
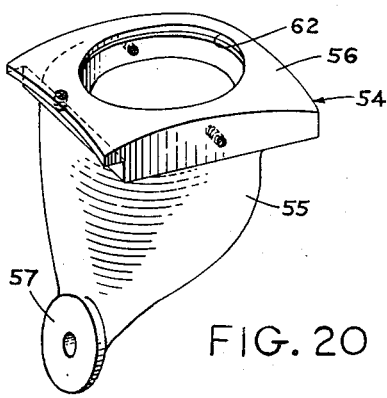
Figure 20 is a perspective view of the carrier employed in the form of ball shown in Figure 17 which carries the thumb stall or plug rotator shown in Figure 11 of the drawings.

The thumb receiving unit generically indicated by the numeral 53 comprises a head 54 which is similar in its shape to the head 4 although in lieu of the pins 5 the carrier 54 has a supporting body 55 formed thereon which extends laterally from the head 56 and has a trunnion 57 formed on its inner end which is mounted upon a rod 58 so as to permit pivotal swinging movement of the carrier 54 in a plane parallel with the diametric plane bisecting the ball 50 at the axis of the normal straight position of the carrier, as shown in Figure 17 of the drawings and through this pivotal movement the carrier 55 and consequently the thumb receiving unit 43 may be moved laterally in substantially the line of curvature of the surface of the ball 50. The trunnion 57 is loosely mounted upon the pin 58 and its pivotal movement is tensioned by means of a spring 59 coiled about the pin 58 and engaged between the trunnion 57 and a washer 60. The pin 58 is threadably carried by a sleeve 61 in the ball 50 so that by rotary adjustment of the pin the tension of the spring 59 may be regulated.

The central opening 62 of the carrier 55 receives a rotor 63, retainer 64 and thumb receiving stall 65 which are identical with the rotator 7, retainer 8 and thumb receiving stalls 11 and thus the thumb receiving stall 11 and retainer 8 are not only rotatably carried by the carrier 54 but are pivotally supported relative to the rotor 63 so that the same degree of various movements of the thumb receiving stall of the structure of the ball shown in Figures 17 to 21 is permitted. A notched quadrant 66 is carried by one of the side walls of the recess 51 and a locking pin 67 is adjustably carried by the rotor 64 for adjustment into any one of the notches of the quadrant 66 to hold the thumb receiving unit in laterally adjusted positions.

The limits of the lateral movement of the thumb receiving unit are indicated by the dotted line circles in Figure 17 of the drawings.

Like in the form of the ball shown in Figures 1 to 15 inclusive a pair of finger receiving units are provided in this second form of the measuring ball construction and these units are located in parallel relation in the lateral extension 52 of the recess 51.

Each of the finger receiving units includes a carrier 70 which embodies a head 71 similar in construction to the carrier 27 and a pivotally mounted supporting arm 72 having a trunnion 73 at its inner end. Each of the trunnions 73 is mounted on a rod 74 adjustably carried by a sleeve 75 and the pivotal tension of the finger receiving units is regulated by means of coil springs 76, the tension of which is regulated by adjustment of the rods 74. Each of the heads 71 of the carriers 70 of the finger receiving units receives a retainer 77 which is identical with the retainer 31 being pivotally connected to the head 71. Each of the retainers 77 receive a finger receiving stall or plug 78 which is identical with the finger receiving stalls or plugs 35. The two pivotally mounted finger receiving units are held in pivotal adjusted positions by means of a toothed quadrant 79 with which suitable elements (not shown) cooperate to hold the finger receiving units in various adjusted pivotal positions.

In this second form of the hand measuring ball the same degree of precision of measuring is provided as is provided in the form of the ball shown in Figures 1 to 15 inclusive, due to the fact that the thumb receiving stall 65 may be moved laterally of its axis in a plane diametrically bisecting the ball 1, it may be rotated in any of its lateral positions and the stall may be pivotally moved in any of its lateral and rotary positions and also each of the finger receiving stalls 78 may be moved laterally in a plane perpendicular to the lateral movement of the thumb receiving stall and relative to each other. The finger receiving stall 78 may be pivotally moved independently of their carriers to vary the pitch angle of their finger receiving holes 80 irrespective of their lateral movement.

In the specification and claims, the term "pitch" is employed to indicate the line of the longitudinal axis of the finger or thumb stall; i. e., to indicate the slope or degree of slope of said longitudinal axes relative to a perpendicular or horizontal plane, and in such use "varying the pitch" is used to indicate variation of the slope or degree of slope of such axes in the perpendicular plane, such as the variation of the pitch or slope of a pendulum in its normal swing, while "angle" is used to indicate the angle of said axes relative to such perpendicular plane, such as the lateral angle of a pendulum laterally of its normal swinging plane.

It will be understood that the invention is not to be limited to the specific construction or arrangement of parts shown, but that they may be widely modified within the invention defined by the claims.

What is claimed is:

1. In a hand measuring ball for measuring the location, span, pitch and angle of the thumb and finger receiving holes in a bowling ball comprising, a ball simulating a bowling ball and having a recess therein extending across the ball parallel with the diameter of the ball, guide supporting members connected to said ball at the sides of said recess and curved to conform to the curvature of the surface of the ball, a thumb receiving unit in said recess, said thumb receiving unit including a carrier, a ring-like rotator rotatably carried by said carrier for rotary movement about the axis of the carrier, a retainer carried by said rotator, a thumb receiving stall removably inserted in said retainer, and means carried by said carrier and connecting the carrier to said supporting guide members for movement of the carrier laterally of its axis in substantially the line of curvature of the surface of the ball.

2. A hand measuring ball as claimed in claim 1 including at least one finger receiving unit mounted in said recess in the ball, arcuate supporting guide members attached to said ball at edges of the recess and extending at right angles to the thumb unit supporting guide members, said finger receiving unit including a carrier, means slidably connecting said finger unit receiving carrier to said guides, a retainer, means pivotally connecting said retainer to said carrier for pivotal movement of the carrier on an axis transverse to the plane of movement of the carrier, and a finger receiving stall removably carried by said finger unit retainer.

3. A hand measuring ball as claimed in claim 1 including at least one finger receiving unit mounted in said recess in the ball, said finger receiving unit including a carrier, a finger stall removably carried by said carrier, means connecting said carrier to said ball whereby the carrier may be moved to vary the position of the finger stall relative to the thumb receiving stall.

4. A hand measuring ball as claimed in claim 1 including pivoting members adjustably carried by said rotator for pivotally adjusting said retainer and stall, whereby the pitch and angle of the stall may be varied, at least one finger receiving unit mounted in said recess in the ball, arcuate supporting guide members attached to said ball at edges of the recess and extending at right angles to the thumb unit supporting guide members, said finger receiving unit including a carrier means slidably connecting said finger unit receiving carrier to said guides, a retainer means pivotally connecting said retainer to said carrier for pivotal movement of the carrier on an axis transverse to the plane of movement of the carrier, and a finger receiving stall removably carried by said finger unit retainer.

5. A hand measuring ball as claimed in claim 1 including means pivotally connecting said retainer to said rotator for pivoted movement of the retainer transversely of the axis of the rotator.

6. A hand measuring ball as claimed in claim 5 including pivoting members adjustably carried by said rotator for pivotally adjusting said retainer and stall whereby the pitch and angle of the stall may be varied.

7. A hand measuring ball as claimed in claim 5 including pivoting members adjustably carried by said rotator for pivotally adjusting said retainer and stall, whereby the pitch and angle of the stall may be varied, said retainer having a pair of parallel radially extending spaced lugs formed thereon, and a ball carried by said pivoting member and engaging between said lugs.

8. A hand measuring ball as claimed in claim 5 including pivoting members adjustably carried by said rotator for pivotally adjusting said retainer and stall, whereby the pitch and angle of the stall may be varied, said stall having a recess in its outer surface between its ends, and a spring pressed locking member carried by said retainer for engagement in said recess to releasably lock the stall in the retainer.

9. In a hand measuring ball for measuring the location, space and pitch of the thumb and finger receiving holes in a bowling ball comprising, a ball simulating a bowling ball and having a recess cut therein, arcuate side and center carrier supporting rails attached to said ball and extending in parallel relation through said recess, said center supporting rail being disposed intermediate of and parallel to said side rails a plurality of carrier members, means slidably connecting each of said carrier members to one side rail and said center supporting rail, said carrier members having cutout portions, retainers in said cutout portions, means pivotally connecting said retainers to said carriers, finger receiving stalls removably carried by said retainers, said stalls having finger receiving holes therein spaced a predetermined distance inwardly from the sides of the stalls adjacent to said center rail whereby when the stalls are carried by the carrier members the innermost parts of the walls of the finger receiving holes in the stalls will always be the same distance apart.

10. A hand measuring ball as claimed in claim 9 wherein said retainers each having a pair of parallel radially extending spaced lugs formed thereon, and a ball carried by each of said pivoting member and engaging between said lugs.

11. In a hand measuring ball for measuring the location, span and pitch of the thumb and finger receiving holes in a bowling ball comprising a ball simulating a bowling ball and having a recess cut therein, said recess having parallel walls a thumb receiving unit in said recess, said thumb receiving unit including a carrier, arcuate guides carried by a pair of parallel walls of said recess, means slidably connecting said carrier to said guide rails to permit movement of the carrier laterally in substantially the line of curvature of the surface of the ball, a rotator rotatably carried by said carrier, a retainer pivotally carried by said rotator, and a thumb receiving stall removably carried by said retainer.

12. In a hand measuring ball for measuring the location, span and pitch of the thumb and finger receiving holes in a bowling ball comprising a ball simulating a bowling ball and having a recess cut therein, said recess having parallel walls a thumb receiving unit including a carrier, arcuate guides carried by a pair of parallel walls of said recess, means slidably connecting said carrier to said guide rails whereby the carrier may be moved laterally in substantially the line of curvature of the surface of the ball, a rotator rotatably carried by said carrier, a retainer pivotally carried by said rotator, and a thumb receiving stall removably carried by said retainer, said recess including a transversely extending section, a plurality of finger receiving units in said recess extension, each of said finger receiving units including a carrier, arcuate guides carried by a pair of parallel walls of said transverse recess extension, means slidably connecting said finger receiving unit carriers to said last named arcuate guides whereby the finger receiving units may be moved in a direction transversely of the pivotal movement of the thumb unit carrier, finger unit retainers pivotally carried by said finger unit carriers, finger receiving stalls carried by said finger unit retainers, and means for pivotally moving said finger unit retainers and stalls relative to said pivoted finger unit carriers.

13. In a hand measuring ball for measuring the location, span and pitch of the thumb and finger receiving holes in a bowling ball comprising a ball simulating a bowling ball and having a recess cut therein, said recess having parallel walls a thumb receiving unit including a carrier, arcuate guides carried by a pair of parallel walls of said recess, means slidably connecting said carrier to said guide rails whereby the carrier may be moved laterally in substantially the line of curvature of the surface of the ball, a rotator rotatably carried by said carrier, a retainer pivotally carried by said rotator, and a thumb receiving space removably carried by said retainer, said recess including a transversely extending section, a plurality of finger receiving units in said recess extension, each of said finger receiving units including a carrier, arcuate guides carried by a pair of parallel walls of said transverse recess extension, means slidably connecting said finger receiving unit carriers to said last named arcuate guides whereby the finger receiving units may be moved in a direction transversely of the pivotal movement of the thumb unit carrier, finger unit retainers pivotally carried by said finger unit carriers, finger receiving stalls carried by said finger unit retainers, and means for pivotally moving said finger unit retainers and stalls relative to said pivoted finger unit carriers, said finger receiving units disposed in side-by-side parallel arrangement, said finger receiving stalls having finger receiving holes therein spaced a predetermined distance inwardly from the facing sides of the stalls, and a center carrier supporting track extending through said recess and engaged by the inner facing sides of said carriers whereby the innermost nearest parts of the walls of the finger receiving openings will always be the same distance apart regardless of the diameter of the finger receiving holes.

14. In a hand measuring ball to provide precision measuring of a hand to determine the span and pitch and angle of the thumb and finger holes in a bowling ball, the combination of a thumb receiving stall and a plurality of finger receiving stalls, means carrying said thumb receiving stall so constructed to allow varying of the position of said thumb receiving stall laterally relative to said finger receiving stalls, means supporting said finger receiving stalls so constructed that the positions of the finger receiving stalls may be moved laterally relative to each other, means pivotally supporting the thumb receiving stall whereby the thumb receiving stall may be moved to vary the pitch of the axis of the stall in a plane perpendicular to the axis of its pivotal movement, and means rotatably supporting the stall to permit rotary movement thereof to provide variation of the angle of its axis in planes other than in the plane perpendicular to its pivotal axis.

15. A hand measuring ball as claimed in claim 14 including means pivotally supporting said finger stalls so constructed that the finger stalls may be moved in a plane parallel to the plane of their movement laterally relative to said thumb receiving stall.

16. In a hand measuring ball for measuring the location, span pitch and angle of the thumb and finger receiving holes in a bowling ball comprising a ball simulating a bowling ball and having a recess cut therein having parallel walls, a thumb receiving unit including a carrier, arcuate guides carried by a pair of parallel walls of said recess, means slidably connecting said carrier to said guiding rails whereby the carrier may be moved laterally in substantially the line of curvature of the surface of the ball, a rotator rotatably carrier by said carrier, a retainer pivotally carried by said rotator, a thumb receiving stall removably carried by said retainer, at least one finger receiving unit mounted in said recess in the ball, said finger receiving unit including a carrier, a finger stall removably carried by said carrier, means connecting said carrier to said ball whereby the carrier may be moved to vary the position of the finger stall relative to the thumb receiving stall.

References Cited in the file of this patent

UNITED STATES PATENTS

| | | |
|---|---|---|
| 2,207,404 | Hinkley | July 9, 1940 |
| 2,319,811 | Akin | Mar. 23, 1943 |
| 2,516,694 | Gillett | July 25, 1950 |
| 2,539,918 | McLaren | Jan. 30, 1951 |
| 2,693,034 | Watson | Nov. 2, 1954 |